United States Patent [19]

Liedenbaum et al.

[11] Patent Number: 5,568,303

[45] Date of Patent: Oct. 22, 1996

[54] UNIT FOR GENERATING SIGNAL PULSES, TRANSMITTER COMPRISING SUCH A UNIT, AND MULTIPLEX TRANSMISSION SYSTEM COMPRISING SUCH A TRANSMITTER

[75] Inventors: Coen T. H. F. Liedenbaum; John J. E. Reid, both of Eindhoven, Netherlands

[73] Assignee: U.S. Philips Corporation, New York, N.Y.

[21] Appl. No.: 494,529

[22] Filed: Jun. 28, 1995

[30] Foreign Application Priority Data

Jun. 30, 1994 [EP] European Pat. Off. .............. 94201891
Sep. 16, 1994 [EP] European Pat. Off. .............. 94202665

[51] Int. Cl.$^6$ ................................................. H04B 10/04
[52] U.S. Cl. ........................ 359/184; 359/181; 359/188; 359/124
[58] Field of Search ........................ 359/115, 124, 359/161, 181, 182, 184, 188

[56] References Cited

U.S. PATENT DOCUMENTS

| | | | |
|---|---|---|---|
| 4,635,263 | 1/1987 | Mollenauer | 372/3 |
| 4,805,235 | 2/1989 | Henmi | 359/182 |
| 5,212,711 | 5/1993 | Harvey et al. | 372/94 |
| 5,311,351 | 5/1994 | Chesnoy | 359/184 |
| 5,373,383 | 12/1994 | LaGasse | 359/181 |

OTHER PUBLICATIONS

"Monolithic Semiconductor Soliton Transmitter", P. B. Hansen et al, OFC '94 Technical Digest, pp. 74–75.

*Primary Examiner*—Leo Boudreau
*Assistant Examiner*—Kinfe-Michael Negash
*Attorney, Agent, or Firm*—Michael J. Balconi-Lamica

[57] ABSTRACT

A unit for generating signal pulses, comprises a first, pulsed laser for supplying a pulse series having a pulse period T and a wavelength $\lambda_1$, and a modulation unit comprising a second laser. The second laser has a wavelength band which is different from $\lambda_1$ and can be modulated at a modulation period T in accordance with a data signal to be transported. The radiation from the second laser) can be injected into the first laser at instants for which it holds that $E(P_m) > E(LP_j)$, in which $E(P_m)$ is the radiation energy of the second laser injected into the first laser at the relevant instant and $E(LP_j)$ is the radiation energy built up in the first laser at the relevant instant. Moreover, the unit comprises a wavelength discriminator which selects the pulses of wavelength $\lambda_1$ from the radiation emitted by the first laser after injection.

5 Claims, 2 Drawing Sheets

UNIT FOR GENERATING SIGNAL PULSES, TRANSMITTER COMPRISING SUCH A UNIT, AND MULTIPLEX TRANSMISSION SYSTEM COMPRISING SUCH A TRANSMITTER

BACKGROUND OF THE INVENTION

1. Field of the Invention

The invention relates to a unit for generating signal pulses, comprising a first, pulsed laser for supplying a pulse series having a pulse period T and a wavelength $\lambda_1$, and a modulation unit for modulating the laser in accordance with a data signal.

The invention also relates to a multiplex transmission system and a transmitter suitable for use in such a system.

2. Discussion of the Related Art

In optical transmission systems for information transport over large distances, an optical transmitter provided with a laser is used for converting a digital electric signal into optical pulses. The laser radiation is modulated in accordance with the signals to be transmitted. In this way a series of optical pulses is formed which can be transported through an optical fiber to an optical receiver in which it is converted into a digital electric signal.

For such transmission systems the aim is, inter alia a larger transmission distance. However, in the optical fiber the transmitted pulses are attenuated due to damping. Generally, the width of the propagating pulses increases as the length of the optical fiber increases. This pulse Widening is the result of the fact that the travel time in the optical fiber is different for radiation of different wavelengths. This phenomenon is referred to as dispersion. A pulse transmitted by the optical transmitter will generally comprise components of different Wavelengths which, due to dispersion, reach the receiver at different instants.

One way of reducing the detrimental effects of pulse widening and damping is to use solitons as signal carrying pulses. Such radiation pulses have such a radiation distribution with respect to time and such a power that pulse narrowing occurs due to a non-linear effect in the optical fiber. If the power of the optical pulses assumes a value within a given interval, it is possible that the effects of pulse widening and pulse narrowing cancel each other.

One of the possibilities of generating solitons is referred to as gain-switching of a diode laser. In this method a short current pulse is applied to a diode laser which in its turn transmits a short optical pulse having a relatively short pulse length, for example of the order of 30 to 40 psec. By passing the optical pulses thus obtained through an optical fiber having a given length and a normal dispersion, its pulse length can be reduced to 15 to 20 psec. These pulses are suitable to be propagated as solitons through an optical fiber. If such a pulse series is to be modulated with a signal to be transmitted, the following problem occurs. To obtain said short optical pulses, the modulation of the current through the laser should be controlled in such a way that each optical pulse is generated by only the relaxation oscillation of the laser. The laser oscillation is determined by the charge carder density and the photon density in the laser medium. The supply of a data signal to the laser means that different current patterns are applied to the laser. These current patterns cause different charge carder densities in the laser medium so that the shape of the optical pulses will start to vary. It has been found that there is a large variation, not only in pulse shape but also in the instant of pulse formation if solitons obtained by gain-switching are to be modulated with data. Jitter is produced so that the pulse position will not be sharply defined with respect to the pulse period.

Another possibility of generating solitons is referred to as mode-locking. In this method a diode laser having an anti-reflective coating is placed on one of the exit faces of an external resonant cavity. Subsequently, the current through the laser is modulated at a repetition frequency which is suitable for the circulation time of the external resonant cavity or for a higher harmonic of this frequency. Then the laser is controlled by the radiation which has been fed back, and after the radiation has circulated several times, the laser will supply short pulses whose length and spectral width are Fourier-limited. A data pulse series to be transmitted can be obtained by modulating, for example the pulse series obtained via mode-locking with the aid of an external modulator arranged outside the resonant cavity and controlled by the data signal to be transmitted, as described, for example in the article "Monolithic semiconductor soliton transmitter" by P. B. Hansen et al. in OFC '94 Technical Digest, pp. 74–75. The diode laser whose pulse series is obtained by mode-locking and the modulator are integrated in a single element in this case.

The drawback of an,external modulator is that it causes extra optical losses and that no sufficient distinction between a digital "1" and a digital "0" can be obtained in the optical signal at the desired high switching rates.

The direct modulation, with a data signal, of pulses which are obtained through mode-locking and may propagate as solitons, i.e. modulation, with the data signal, of the electric current through the laser, is neither possible because then the process of generating pulses suitable for forming solitons is disturbed. In fact, this process requires a continuous feedback in the external resonant cavity. Whenever the current through the laser is interrupted in conformity with the electric data signal, this continuous feedback is no longer realised. For this reason the repetition time of the modulator with which the data signal to be transmitted is applied to the pulse series of the diode laser should be adapted to the length of the resonant cavity for the purpose of modulation. This results in considerably strict tolerances in the manufacture of such units.

SUMMARY OF THE INVENTION

It is an object of the invention to provide a unit for generating signal pulses which may propagate as solutions, in which the average charge carrier density per optical pulse of the signal pulse series is substantially constant. Moreover, in such a unit, the losses due to modulation are reduced considerably and the discrimination between the presence or absence of a signal is enhanced considerably.

The unit according to the invention is therefore characterized in that the modulation unit comprises a second laser having a wavelength band which is different from $\lambda_1$ and can be modulated in accordance with a data signal to be transported at a modulation period which is equal to T and whose radiation can be injected into the first laser at instants for which it holds that $E(P_m) > E(LP_i)$, in which $E(P_m)$ is the radiation energy of the second laser injected into the first laser at the relevant instant and $E(LP_i)$ is the radiation energy built up in the first laser at the relevant instant, and in that the unit further comprises a wavelength discriminator for selecting the wavelength $\lambda_1$ from the radiation transmitted by the first laser after injection.

The first laser is driven at a given clock frequency at a wavelength $\lambda_1$ which will function as signal wavelength in such a way that it supplies a pulse series having a pulse period T. A data signal to be transported is applied to a second laser. This laser may be, for example a DFB laser or a multimode laser which is modulated with current or with injection of radiation in accordance with the data signal to be transported. The pulses of the pulse series thus formed are injected into the first laser in the time intervals within which pulses are built up in this laser, in other words in the time intervals in which the above-mentioned relation holds, so that the first laser is forced to generate optical pulses in these time intervals at a wavelength which is equal to that of the injected pulses.

In fact, it is generally known that lasers are sensitive to laser radiation which reaches the active medium of the laser. Dependent on the quantity of radiation, this may give rise to unwanted effects such as an increase of the line width, a higher noise or mode hopping and hence variations of the output spectrum. The behaviour of the laser is predominantly determined by events in the time intervals in which an optical pulse is built up. By injecting a sufficiently large number of photons in this time interval, these extra photons will determine the behaviour of the laser. The laser may be controlled in this way. The injection may take place both at the front mirror and at the rear mirror of the laser.

Moreover, the unit comprises a wavelength discriminator selecting radiation at a wavelength $\lambda_1$.

Selecting may be understood to mean that pulses of wavelength $\lambda_1$ are passed. When the radiation of the first laser which, after injection, not only comprises pulses of wavelength $\lambda_1$ but also pulses of a different wavelength, is applied to the wavelength discriminator, an optical data signal which is built up of pulses of wavelength $\lambda_1$ will then be produced at the output of the discriminator. Thus, the pulses which correspond to the pulses of the injected signal pulse series are absent in the pulse series supplied by the pulsed laser after injection, so that the pulse pattern at the output of the discriminator will be complementary to the data pulse pattern present at the second laser.

Selecting may also be understood to mean that the pulses of wavelength $\lambda_1$ are blocked. In this case a pulse series whose pulse pattern corresponds to the pulse pattern of the signal pulse series from the second laser is produced at the output of the discriminator.

In both cases, the pulse series supplied by the discriminator is suitable to be transported substantially without pulse widening.

Since the modulation is effected by external injection, the average charge carrier density remains substantially constant and the optical pulses of the signal pulse series will have substantially the same shape, so that the discrimination between the presence or absence of a signal, in other words the discrimination between pulses having a wavelength different from $\lambda_1$ and pulses having a wavelength equal to $\lambda_1$, has increased considerably.

A further embodiment of the unit according to the invention is characterized in that the first laser is a diode laser having a Fabry-Pérot resonant cavity and being active at $\lambda_1$ and in that the wavelength of the second laser is adjusted to a mode which is different from $\lambda_1$ and fits in the resonant cavity.

By choosing a laser having a Fabry-Pérot resonant cavity for the first laser and by adjusting the wavelength of the second laser to a mode which fits in the resonant cavity of the first laser and is different from $\lambda_1$, the coupling into the cavity will be optimal.

A further embodiment of the unit according to the invention is characterized in that the first laser and the second laser are integrated on the same support.

In this way, a compact unit is obtained and the two lasers can be aligned in a relatively simple and optimum manner with respect to each other.

The invention further relates to a transmitter for use in a multiplex transmission system, an embodiment of which is characterized in that the transmitter comprises a plurality of units as described hereinbefore, with all first lasers emitting radiation at a wavelength of $\lambda_1$.

By making use of more than one unit, the data transmission rate of the transmission system can be increased by a factor which is equal to the number of units used.

The first lasers of the units used preferably operate at the same wavelength. In that case the combined output of the different units is directly suitable to be transported through the transmission medium.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
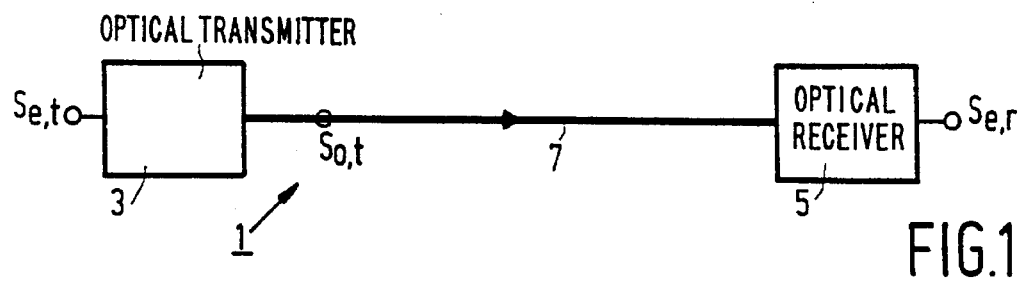
FIG. 1 shows diagrammatically an embodiment of a known multiplex transmission system.

The multiplex transmission system 1 shown in FIG. 1 comprises an optical transmitter 3 and an optical receiver 5. A transmission medium 7 is present between the transmitter 3 and the receiver 5. A digital electric signal $S_{e,t}$ to be transmitted is applied to the optical transmitter 3. This signal is converted into optical pulses $S_{o,t}$ in the transmitter 3. The output of the transmitter 3 is connected to an input of the transmission medium 7, for example an optical fiber, the output of which is connected to an input of the receiver 5. After transport of the optical pulses through the transmission medium, the optical pulses are converted in the receiver 3 into a digital electric signal $S_{e,r}$ again which is available at the output of the receiver 5.

To this end, the transmitter 3 in the known system comprises a diode laser which will supply an optical pulse pattern, for example by means of current modulation, which pulse pattern corresponds to the digital data signal to be transmitted. However, generally an optical pulse transmitted by the transmitter 3 comprises radiation having different wavelength components. Since the travel time in the transmission medium 7 is different for each wavelength, the different components will reach the receiver 5 at different instants. Consequently, pulse widening will generally occur, which increases with an increasing length of the transmission medium. As is known, pulse widening can be avoided when the signal-conveying pulses are solitons. Such radiation pulses have such a time envelope and such a power that the pulse widening, which would occur due to dispersion in the transmission medium, is compensated by non-linear effects which occur at such powers in the medium 7 and give rise to pulse narrowing.

The present invention proposes to provide a unit with which signal pulses are generated in which the pulse Widening is considerably reduced, so that they are transported over relatively large distances without any distortion.

Figure 2A:
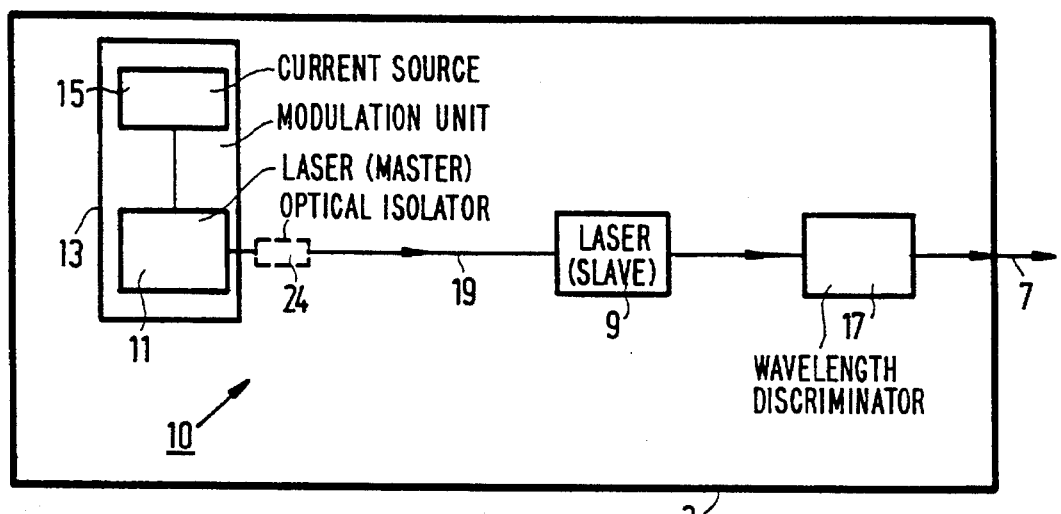
FIGS. 2a and 2b show diagrammatically two embodiments of a unit for generating signal pulses according to the invention.

FIG. 2a shows a first embodiment of such a unit. The unit 10 shown in this FIGURE comprises a pulsed laser 9, also referred to as slave laser which emits radiation at a pulse period T and a wavelength $\lambda_1$. This pulse series is modulated with data by making use of a second laser 11 also referred to as master laser, which forms part of a modulation unit 13. This laser 11 may be, for example a continuous DFB laser which is operated at a relatively high bias current by means of a current source 15. Via current modulation the radiation of this laser is provided with a data series, so that the optical pattern of this laser will consist of a plurality of "0" and "1", while the optical power of the "0" level is unequal to zero. Instead of using current modulation, the laser 11 may also be provided with data by means of injection of radiation from another pulsed laser which is connected to the laser 11, for example via a fiber coupling. The modulation period of the second laser is then adjusted to the pulse period T of the first laser. By injecting each pulse of the pulse series of the second laser 11 into the first laser 9 in a short time interval within which a pulse is built up in the first laser 9, it is achieved that the wavelength of the last-mentioned pulse is equal to the wavelength of the injected pulse, provided that the condition $E(P_m) > E(LP_i)$ is satisfied, in which $E(P_m)$ is the injected energy of a pulse of the second laser and $E(LP_i)$ is the radiation energy built up in the first laser at the instant of arrival of the injected pulse. This condition is fulfilled by those pulses of the laser 11 which have a sufficiently large energy content. These are the pulses representing a digital "1". When the second laser thus transmits such a "1" pulse at a given wavelength $\lambda_2$ different from $\lambda_1$, the first laser will emit a pulse having a wavelength $\lambda_2$ instead of a wavelength $\lambda_1$. When the second laser does not emit a pulse, in other words a "0" in the digital signal, the first laser will generate a pulse of the wavelength $\lambda_1$. In this way, the first laser 9 thus provides a pulse series having a pulse period T whose wavelength of successive pulses is determined by the pulse pattern of the second laser 11. When this pulse series is applied to a wavelength discriminator 17 selecting radiation at a wavelength $\lambda_1$, a modulated pulse pattern will be obtained which is complementary or corresponds to the pulse pattern of the master laser 11, dependent on whether the discriminator passes or blocks the wavelength $\lambda_1$. In fact, selecting may be understood to mean that pulses of wavelength $\lambda_1$ are passed. When the radiation of the first laser 9 which, after injection, not only comprises pulses of wavelength $\lambda_1$ but also pulses of a different wavelength, is applied to the wavelength discriminator 17, an optical data signal which is built up of pulses of wavelength $\lambda_1$ will then be produced at the output of the discriminator 17. Thus, the pulses which correspond to the pulses of the injected signal pulse series are absent in the pulse series supplied by the first laser 9 after injection, so that the pulse pattern at the output of the discriminator 17 will be complementary to the data pulse pattern present at the second laser 11.

Selecting may also be understood to mean that the pulses of wavelength $\lambda_1$ are blocked. In this case, an optical data signal, whose pulse pattern corresponds to the pulse pattern of the signal pulse series from the second laser and whose pulses have a wavelength $\lambda_2$, is produced at the output of the discriminator 17 when the radiation from the first laser 9 comprises pulses of both wavelength $\lambda_1$ and wavelength $\lambda_2$ after injection.

The signal pulses thins produced may be converted to solitons in the transmission medium. In view of their time envelope and optical power, such pulses are eminently suitable for long-distance transmission.

The discriminator 17 and the modulation unit 13 may be present at both sides of the slave laser 9, as is shown in FIG. 2a. Lasers 9 and 11 may be coupled together via an optical fiber 19, a, is shown in the FIGURE. The two lasers 9 and 11 may alternatively be coupled together via a butt coupling (not shown).

Figure 2B:
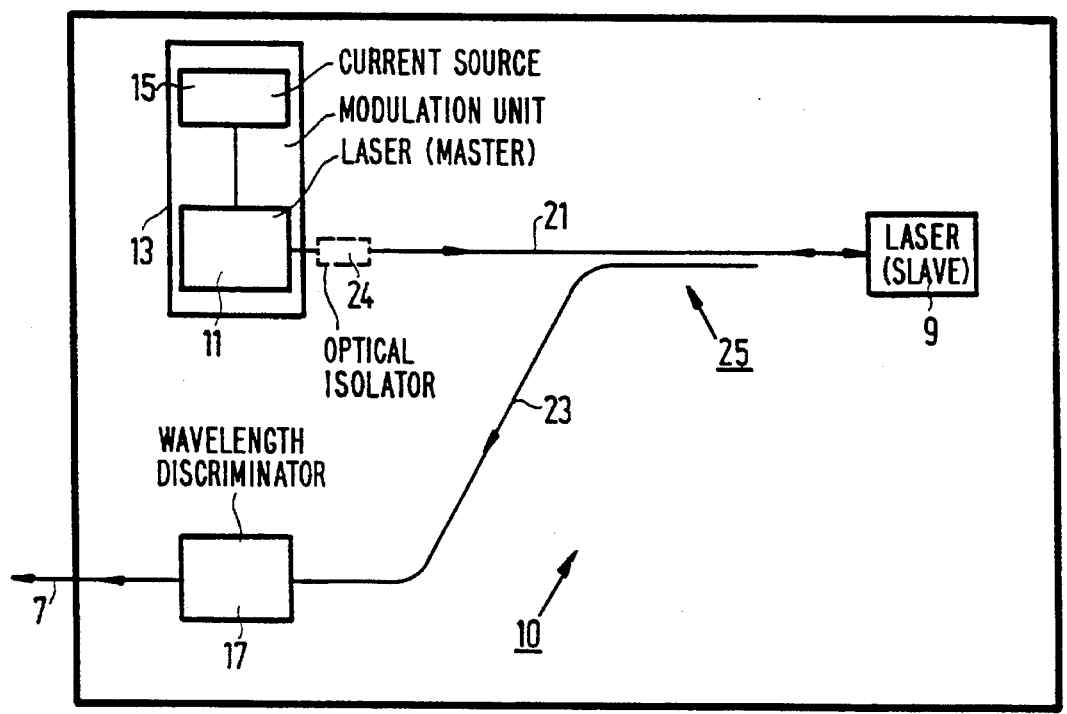

The discriminator 17 and the modulation unit 13 may alternatively be present at the same side of the sloe laser 9, as is shown in FIG. 2b. In that case the radiation of the master laser 11 is passed to the slave laser 9 via a first optical fiber 21. The radiation which is emitted by the slave laser 9 after injection of radiation of the master laser 11, is coupled into the second fiber 23 by means of a fiber coupler 25 of the first fiber 21 and subsequently passed towards the discriminator 17.

If desired, an optical isolator 24 may be arranged behind the master laser 11 so as to prevent radiation refitted in the unit 10 from returning to the laser 11. Since the isolator is facultative, it is shown by means of a broken line in the FIGURES.

By integrating the two lasers 9, 11 and the discriminator 17 on one and the same substrate, the unit may be made compact, robust and stable.

In principle, the radiation of the master laser 11 may have any wavelength, except the wavelength at which the slave laser 9 is operated. Coupling the radiation of the master laser 11 into the slave laser 9 is, however, optimal if the slave laser 9 is a laser having a Fabry-Pérot resonant cavity, in which the wavelength of the master laser corresponds to the wavelength of a non-active mode which fits in the resonant cavity.

The efficiency at which the modulation is transferred can be optimized by ensuring that the polarization of the radiation incident in the slave laser 9 is not exactly perpendicular to the polarization if the emitted radiation. This can be realised by means of a polarization-rotating element such as, for example a $\lambda/4$ plate in a suitable orientation.

Instead of being provided with one unit, the transmitter of a multiplex transmission system may alternatively be provided with a plurality of parallel-arranged units according to the invention. The data transmission rate of the transmission system, of which the transmitter forms part, can thereby be increased by a factor which is equal to the number of built-in units.

Figure 3:
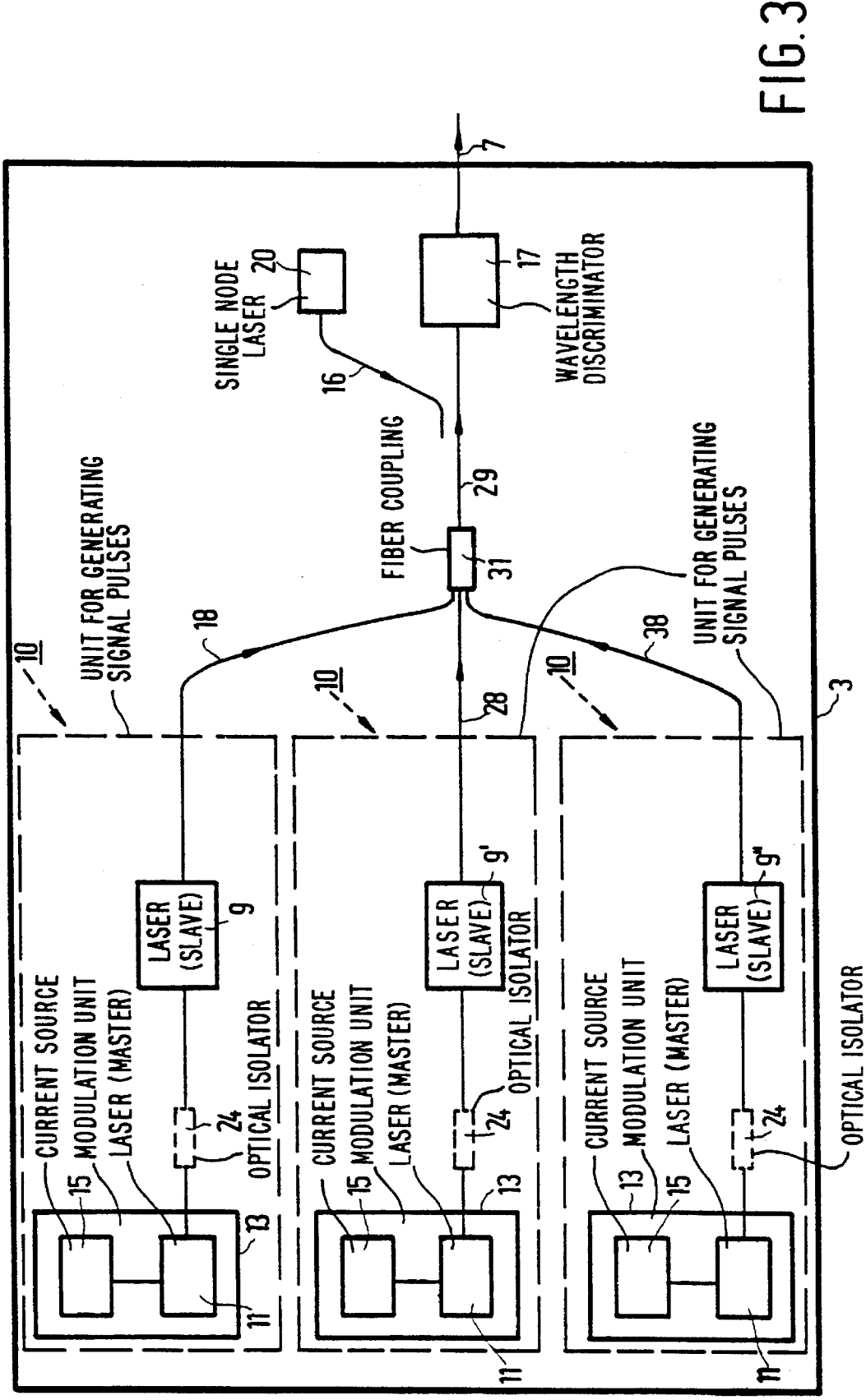
FIG. 3 shows diagrammatically an embodiment of a transmitter having more than one unit for use in a multiplex transmission system according to the invention.

FIG. 3 shows an embodiment of a transmitter 3 comprising three units 10 of the type shown in FIG. 2a. The pulse patterns supplied by the slave lasers 9, 9', 9" are combined via three optical fibers 18, 28, 38 in a single fiber 29 via a fiber coupling 31. All slave lasers 9, 9', 9" old rate at the same wavelength $\lambda_1$ so that it is sufficient to use a single discriminator 17.

If the discriminator 17 is implemented in such a way that the wavelength $\lambda_1$ is passed, the wavelength of the master lasers 11 need not be the same for all lasers 11 but should be different from $\lambda_1$ for all lasers 11. The three lasers 9, 9', 9" may be brought to the same wavelength by arranging a single mode laser 20 having the wavelength $\lambda_1$, for example between the fiber coupling 31 and the discriminator 17 via a separate optical fiber branch 16, and by injecting its radiation via 31 and 18, 28, 38 into the three slave lasers 9, 9', 9" (injection locking), in which the coupling is weaker than the coupling of the radiation of the master laser 11. In that case the coupling of radiation of the master laser 11 into the slave lasers will prevail over the coupling of the radiation of the laser 20 into the slave lasers when the master laser 11 emits a "1" pulse. Consequently, a composite pulse series of signal pulses all having the same wavelength and thus being suitable for transmission through the transmission medium is produced at the output of the discriminator 17. If desired, the laser 20 may be arranged behind the discriminator 17 instead of in a separate branch 16, because this discriminator passes radiation of wavelength $\lambda_1$ in both directions.

If the discriminator is implemented in such a way that the wavelength $\lambda_1$ is blocked and all other wavelengths are passed, the data signals from the master lasers 11 should be conveyed at the same wavelength. In practice, this may be realised, for example, by making use of a single master laser 11 and connecting three modulators thereto so as to generate the three different data signals, each of which can subsequently be injected into a slave laser 9, 9' or 9". A composite pulse series of signal pulses at the wavelength of the master laser, which is consequently suitable for transmission through the transmission medium, is now produced at the output of the discriminator 17.

A condition in both these cases is that the signal pulse series to be combined are synchronized with respect to each other in such a way that the series fit into each other without pulses overlapping.

We claim:

1. A unit for generating signal pulses, comprising:

a first, pulsed laser for supplying a pulse series having a pulse period T and a wavelength $\lambda_1$; and a modulation unit for modulating said first laser in accordance with a data signal, wherein said modulation unit comprises a second laser having a wavelength band which is different from $\lambda_1$ and wherein the second laser is modulated in accordance with a data signal to be transported at a modulation period which is equal to T and whose radiation is injected into said first laser at instances for which it holds that $E(P_m)>E(LP_i)$, in which $E(P_m)$ is the radiation energy of the second laser injected into said first laser at the relevant instant and $E(LP_i)$ is the radiation energy built up in said first laser at the relevant instant; and wherein said unit further comprises a wavelength discriminator for selecting the wavelength $\lambda_1$ from the radiation transmitted by said first laser after injection.

2. The unit as claimed in claim 1, wherein said first laser is a diode laser having a Fabry-Pérot resonant cavity and being active at $\lambda_1$ and wherein the wavelength of the second laser is adjusted to a mode which is different from $\lambda_1$ and fits in the resonant cavity.

3. The unit as claimed in claim 1, wherein said first laser and the second laser are integrated on a common support.

4. A multiplex transmission system comprising a transmitter and a receiver with a transmission medium in between, wherein said transmitter comprises at least one unit for generating signal pulses as claimed in claim 1.

5. The multiplex transmission system as claimed in claim 4, wherein said transmitter comprises a plurality of units for generating signal pulses, with all first lasers emitting radiation at a wavelength $\lambda_1$.

\* \* \* \* \*